United States Patent
Hesthamar et al.

[11] Patent Number: 5,942,697
[45] Date of Patent: Aug. 24, 1999

[54] DEVICE FOR MEASURING COMPRESSIVE FORCES

[75] Inventors: Tore Hesthamar, Tolvsrod; Torgeir Landaas, Svelvik; Ole E. Bronlund, Siggerud, all of Norway

[73] Assignee: Scan-Mag Sense AS, Huslysund, Norway

[21] Appl. No.: 08/877,706

[22] Filed: Jun. 18, 1997

[51] Int. Cl.[6] .................................................. G01L 1/12
[52] U.S. Cl. ........................................ 73/862.69; 73/763
[58] Field of Search ............................ 73/818, 862.69, 73/763, 777

[56] References Cited

U.S. PATENT DOCUMENTS

| | | | |
|---|---|---|---|
| 3,745,448 | 7/1973 | Hiratsuka et al. | 73/862.69 |
| 4,048,851 | 9/1977 | Portier | 73/862.69 |
| 4,138,783 | 2/1979 | Portier | 73/862.69 |
| 4,561,314 | 12/1985 | Aley et al. | 73/862.69 |

FOREIGN PATENT DOCUMENTS

| | | | |
|---|---|---|---|
| 568972 A2 | 11/1993 | European Pat. Off. | 73/869 |
| 23 57 105 B2 | 5/1974 | Germany . | |

*Primary Examiner*—Max H. Noori
*Attorney, Agent, or Firm*—Sidley & Austin

[57] ABSTRACT

A device for measuring compressive forces, comprising an annular body (1) having a pair of opposite, force-receiving front surfaces (2, 3) which are perpendicular to the central principal axis (4) of the body, and an annular cavity (5) essentially concentric with the principal axis and receiving a sensor means (6) for delivery of an electrical signal representing the force influence. The sensor means (6) comprises a sensor element (9) placed on the radially inner surface (7) of the cavity (5), said surface being situated at a distance from the principal axis (4) essentially corresponding to the radius ($r_R$) for moment equilibrium for that part of the ring body (1) which receives a load.

13 Claims, 2 Drawing Sheets

DEVICE FOR MEASURING COMPRESSIVE FORCES

TECHNICAL FIELD OF THE INVENTION

The invention relates to a device for measuring compressive forces is disclosed which comprises an annular body having a pair of opposite, force-receiving front surfaces which are perpendicular to the central principal axis of the body, and an annular cavity essentially concentric with the principal axis and receiving a sensor for delivery of an electrical signal representing the force influence.

BACKGROUND OF THE INVENTION

A device of the above-mentioned type is known from DE-B2-2 357 105. This known device comprises a ring body consisting of a magnetostrictive material and having an annular cavity for the receipt of a measuring winding. The device is based on the characteristic of a magnetostrictive material that it changes its permeability under mechanical load. This results in changes of the magnetic flux through the measuring winding, i.e. to changes of the AC resistance of the measuring winding. The object of the invention according to said publication is to provide a device for magneto-elastic measurement of compressive forces wherein the ring body in case of pressure influence is exclusively or at least to such an extent only compressively loaded that a harmful influence on the accuracy of the measuring result because of occurring tensile stresses in the material is eliminated, so that the measurement becomes as accurate as possible. This object is achieved in that each front surface of the ring body has a ring groove which is aligned with the cavity and having a width essentially equal to the width of the cavity, so that on each front surface there are formed two circular projections of which each lengthens one of the side walls of the ring body and which together form the force-receiving surface. Thus, it is here the question of a special design of the front surfaces of the ring body.

In the known device the material choice is strongly limited because of the fact that the material of the ring body must be magneto-elastic. The measuring winding must be relatively large since it has to magnetize a large "iron" volume with alternating current which must have a relatively low frequency with a view to reduced eddy-current losses. In addition, the device will not be suitable for measuring preloads in critical bolt connections since it is not constructed to stand up to the high stresses occurring in the material in these critical applications.

SUMMARY OF THE INVENTION

When developing the present invention, the aim has been to provide an improved force sensor which is suitable for assembly control and/or monitoring of the preload in critical bolt connections, to thereby achieve maximum security and minimum maintenance costs. The device then shall replace existing intermediate discs or washers, or be introduced as washers where such do not exist, in the typical bolt connections, e.g. in slew ring bearings, flanges in pipes, motor cylinder heads, earthing anchors etc. In that the device according to the invention is mounted under the nut in the same way as a standard washer, two substantial advantages are achieved, viz. that the preload is measured directly in the bolt connection, and that the bolt and the nut, which are the critical members, remain completely unaffected.

Another intended field of application is to use the device as a load cell, e.g. in weighing processes, and especially in weighing processes with a high degree of dynamics, wherein existing technology has a relatively short working life.

Thus, it is an object of the invention to provide a device giving a better control with preloads in bolt connections in assembly and/or continuous or periodical control of preload forces in bolt connections, for example to avoid breakdown, leakages and the like.

Another object of the invention is to provide a device which can be used as a load cell, to simplify and improve weighing processes on e.g. transport equipment and the like, and also achieve a substantially extended working life for such equipment in weighing processes with a high degree of dynamics.

An additional object of the invention is to provide a device which nearly eliminates influences from variations of the boundary conditions on the measuring result, because of a great mechanical stability in the region of the ring body wherein the sensor means is placed.

An additional object of the invention is to provide a device which is very well suited for series production with low production costs.

For the achievement of the above-mentioned objects there is a provided a device of the introductorily stated type which, according to the invention, is characterized in that the sensor means comprises a sensor element placed on the radially inner surface of the cavity, said surface being situated at a distance from the principal axis essentially corresponding to the radius for moment equilibrium for that part of the ring element which receives a load.

In an advantageous embodiment of the device the cavity is formed as a narrow gap having parallel, radially inner and outer surfaces which are perpendicular to the front surfaces, the cross-sectional area of the cavity in a plane parallel to the front surfaces being much smaller than the remaining cross-sectional area of the ring body in said plane.

The sensor element preferably consists of an amorphous, magneto-elastic ribbon which is attached or bonded to the radially inner surface of the cavity, the ribbon being surrounded by an additional sensor element in the form of an excitation/-pick-up coil which is intended for operation at relatively high frequencies (radio frequencies). With the stated design of the sensor element, the measurements are carried out in a continuous circumference around the ring body, more specifically along the outer circumference of that part of the ring body which is located inside of the cavity. This means that the sensor element is an integrator integrating the load along the whole said circumference.

By locating the sensor element at the place for moment equilibrium of the ring body, substantially improved mechanical characteristics are obtained. Firstly, the placing implies that compression of the sensor element will be equal to the average compression of the ring body, and thereby will reflect the acting load in the ratio 1:1. Further, the placing implies a more robust sensor which to a lesser extent is influenced by variations in the boundary conditions, such as the nature of the base or support, the surface and obliquity of the nut, the nature of the bolt etc. In addition, an oblique mounting of the ring body will not imply any large source of error because of the placing of the sensor element and the integration effect thereof.

As regards the calculation of the location of the place for moment equilibrium of the ring body, this is further described below.

One of the most important advantages of the structure according to the invention is that one eliminates to the largest possible extent the influences of variations in boundary conditions. With a load bearing element which is as low/short as that which is of current interest in the present case (e.g. 14 mm high and 60–70 mm in diameter), the sensor element will be highly subjected to influences from variations in boundary conditions, such as variations in surfaces, assembly positions, assembly routines, etc. In conventional, ordinary compression load cells this problem is solved by making the load bearing element long and slender, wherein the sensor element itself is located far from the upper and lower boundary, i.e. the load-bearing surfaces. One does not have the possibility for this in washers, and it is on this background that the device according to the invention, with its ideal placing of the sensor element, has been developed.

BRIEF DESCRIPTION OF THE DRAWINGS:

The invention will be further described below in connection with exemplary embodiments with reference to the drawings, wherein.

DETAILED DESCRIPTION OF THE INVENTION

Figure 1:
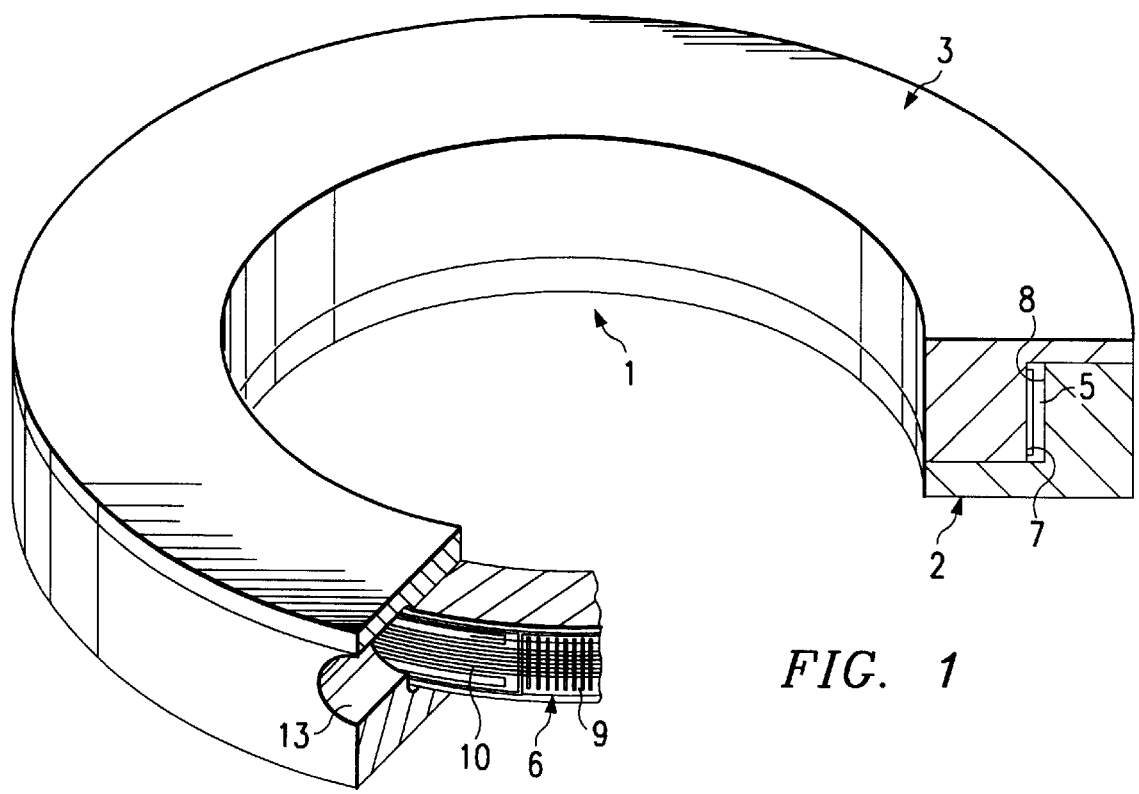
FIG. 1 shows a sectional perspective view of an embodiment of a device according to the invention.

As appears from the drawings, the device according to the invention comprises an annular body 1 having a pair of opposite, planar front surfaces 2, 3 which are perpendicular to the central principal axis 4 (FIGS. 3 and 4) of the ring body and which, in use, receive the axially acting compressive forces which are to be measured by means of the device. The ring body 1 is provided with an encircling annular internal cavity 5 which is concentric with the principal axis 4 and which receives a sensor means 6.

As appears, the cavity 5 is formed as a narrow gap having parallel, radially inner and outer surfaces 7 and 8, respectively, which are normal to the front surfaces 2, 3, the cross-sectional area of the cavity in a plane parallel to the front surfaces, i.e. perpendicular to the principal axis 4, being much smaller than the remaining cross-sectional area of the ring body 1 in the same plane.

The sensor means 6 comprises a first sensor element in the form of a ribbon 9 of an amorphous, magneto-elastic material. This material has a high magnetic permeability and a strong relation between the magnetic permeability and the mechanical stress to which the material is subjected. The sensor ribbon 9 is placed on, and more specifically fastened or bonded to, the radially inner surface 7 of the cavity 5, this surface being situated at a distance from the principal axis 4 of the ring body 1 essentially corresponding to the radius ($r_R$ in FIG. 3) for moment equilibrium for that part of the ring body which receives a load. This placing of the sensor ribbon has been found to give optimum constructional and operational properties, something which also has been verified by calculations and FEM analysis (Finite Element Model analysis).

The sensor means also comprises an additional sensor element consisting of an excitation/pick-up coil 10 which is placed on the outside of the sensor ribbon 9 and thus surrounds this. The excitation coil 10 is intended for operation at relatively high frequencies (radio frequencies). The coil is connected through a flexible circuit 11 to a contact or the like, for excitation/picking-up of sensor signals, or connected to an ASIC circuit (ASIC=Application Specific Integrated Circuit) for excitation/picking-up and internal signal processing.

The sensor means is directionally oriented, so that its most sensitive direction is substantially parallel with the principal axis of the ring body.

Figure 3:
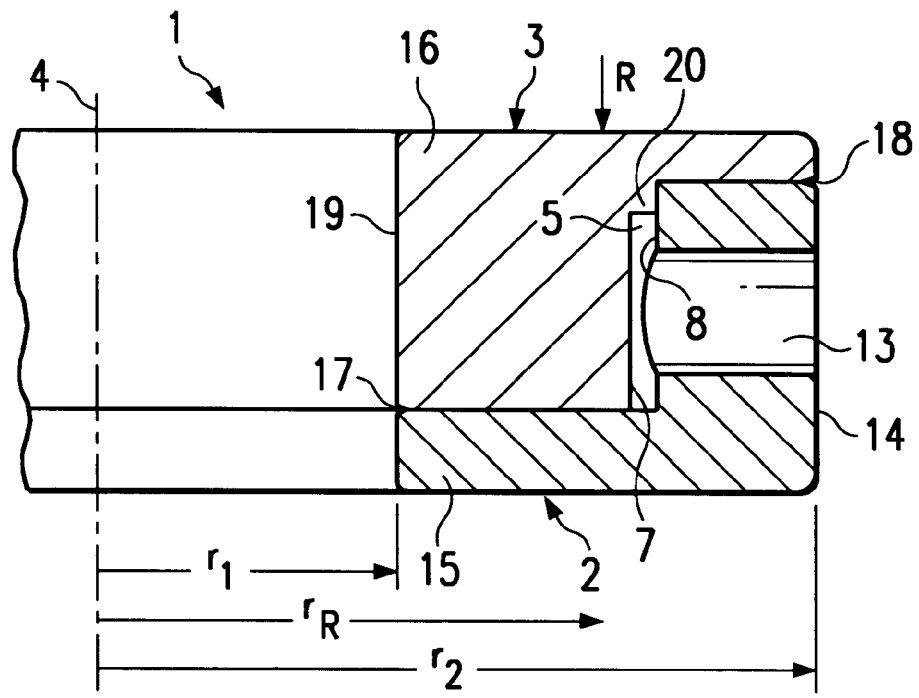
FIG. 3 shows an incomplete cross-sectional view of an embodiment of the ring body, this being disc-shaped and made up from two disc parts.

For calculation of the place or the radius for moment equilibrium of the ring body reference is made to FIG. 3 wherein the ring body 1 is shown to have an inner radius $r_1$ and outer radius $r_2$, and wherein the radius for moment equilibrium is designated $r_R$. The equation for moment equilibrium then becomes:

$$\int_{r_1}^{r_R} 2\pi r(r - r_R) \cdot dr = \int_{r_R}^{r_2} 2\pi r(r - r_R) \cdot dr$$

This gives the following expression for $r_R$:

$$r_R = \frac{2}{3} \cdot \frac{r_2^3 - r_1^3}{r_2^2 - r_1^2}$$

The above formula gives the placing of the force resultant R and simultaneously moment equilibrium for a solid disc-shaped ring body which is subjected to a uniform axial load. The formula must, however, be corrected for the cavity of the ring body/washer with a factor $K_i$. In addition, when the washer is mounted under a nut on a threaded bolt, the formula also must be corrected for the distribution of the attacking force over the surface of the washer as a function of angle of thread and type of nut, with a factor $K_n$. The final formula then becomes:

$$r_R = \frac{2}{3} \cdot \frac{r_2^3 - r_1^3}{r_2^2 - r_1^2} + K_i + K_n,$$

where the factors $K_i$ and $K_n$ must be calculated for all washer/nut combinations.

Figure 2:
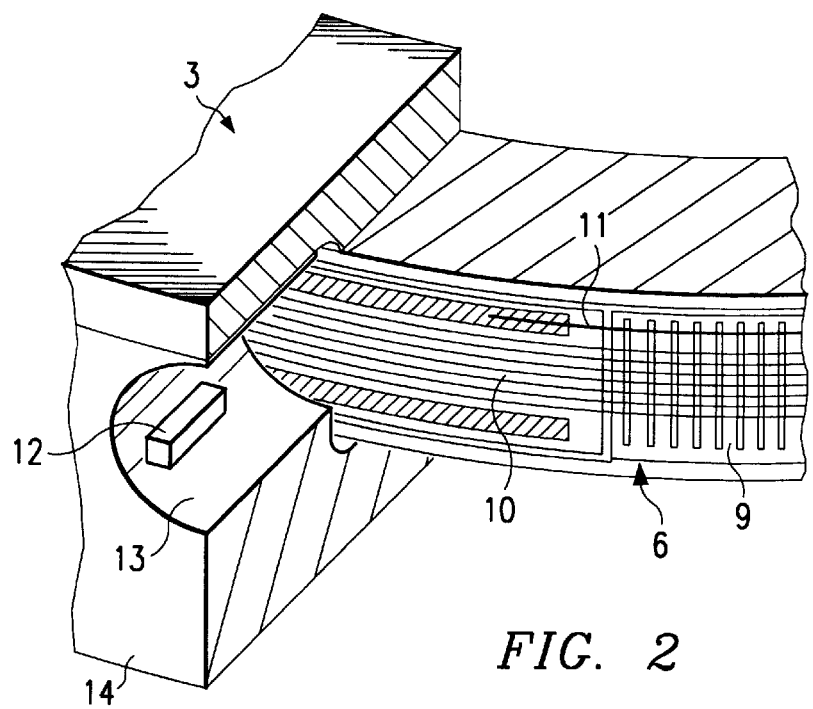
FIG. 2 shows a part of FIG. 1 on an enlarged scale.

In operation of the device, this delivers an electrical signal which in all essentials represents that part of the external force influence which is essentially parallel with the principal axis. Communication with the surroundings, i.e. transfer of the electrical signal to an external, signal-receiving device, takes place by means of an electromagnetic transmission means, so that the signal is transmitted without any electrical line connection. The transmission means comprises a connector and an ASIC circuit. This means, which in FIG. 2 is only symbolized by a block 12, is placed in a radially extending bore 13 extending from the internal cavity 5 to the outer surface 14 of the ring body. Another embodiment of the transmission means will be an ordinary electrical contact.

When the device is loaded by a compressive force acting on the front surfaces of the ring body, the ring body will transfer the strain (deformation) to the sensor ribbon 9. The magnetic permeability of the sensor ribbon then will change, which results in a corresponding change of the inductance of the coil 10. The result will be processed in the ASIC circuit and can be read by means of a hand-held instrument. In continuous monitoring one may suitably use a fixed electrical connection via an electrical contact.

The ring body 1 itself expediently is made of steel. However, the material choice is not critical as long as the material has a sufficient yield point and ultimate strength to withstand the maximum force or load applied to the device. As shown, the ring body is disc-shaped and in the illustrated embodiments made up from two coaxial disc parts which are fastened to each other and in assembled condition define the cavity 5.

Thus, in the embodiment of FIG. 3, the ring body or washer consists of a pair of load bearing parts, viz. a lower part 15 and an upper part 16. As appears from the Figure, the lower part 15 has an upwardly extending outer part having an inner peripheral surface constituting the radially outer surface 8 of the cavity 5, whereas the upper part 16 has a downwardly extending inner part having an outer peripheral surface constituting the radially inner surface 7 of the cavity. The two parts 15, 16 bear against each other along lower and upper, horizontal surface portions, and the parts are joined in joints 17 and 18 extending along the inner and outer peripheral surfaces 19 and 14, respectively, of the ring body/washer. The parts suitably are joined by e.g. fusion welding.

As shown in FIG. 3, the upper washer part has a corner projection 20 in the transition between the downwards extending part and the upper horizontal surface portion. This projection has the same radial width as the cavity 5, so that a force fit is provided between the outer side of the projection and the adjacent peripheral surface of the upwards extending part of the lower part 15. In this manner one achieves that the parts 15 and 16 are kept together after they are assembled, during possible transport and during the welding operation.

It will be clear that a washer having an internal cavity as shown in the drawings can be constructed from separate parts which are formed in many different ways. The embodiment shown in FIG. 3 has, however, a number of advantageous properties which can be summarized as follows: It consists of a minimum number of parts which are easy to machine as well as easy to assemble. The embodiment gives an easy assembly of the sensor ribbon 9 and the excitation coil 10. Welding takes place at the inner and outer peripheral surfaces, something which gives a good control with the contact surces, i.e. the bottom and top surfaces 2, 3, and no heat problems at the sensor ribbon. In addition, there are no problems in keeping the parts together (in the correct relative position) during transport and during welding.

As mentioned in the introduction, the device according to the invention will, inter alia, be used as an intermediate disc or washer in usual bolt connections. For this reason the device must be constructed for use together with standard nuts. There are a great number of different types of nuts in the market. Two of the most frequently used are the cylindrical nuts, which are e.g. often used in slew ring bearings, and the widely used hexagonal nuts. The embodiment shown in FIG. 3 is designed for cylindrical nuts, whereas in FIG. 4 there is shown an embodiment which is designed for use together with hexagonal nuts.

Figure 4:
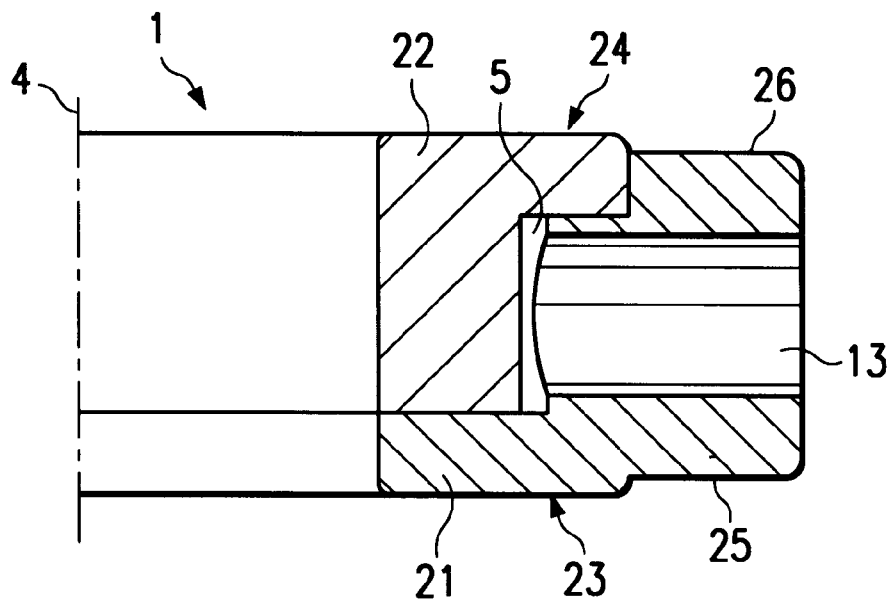
FIG. 4 shows a similar cross-sectional view as FIG. 3, but with another design of the disc parts.

The embodiment in FIG. 4 to a great extent is similar to the embodiment in FIG. 3, but the configuration of the lower and upper parts 21 and 22, respectively, of the washer is partly different from FIG. 3. Thus, the lower and upper parts 21, 22 have respective load-bearing surfaces 23, 24 having a smaller radial width than the width of the front surfaces 2, 3, for adaptation to the load surface of the typical hexagonal nut. Further, the lower part 21 has an outer peripheral part with bottom and top surfaces 25, 26 which are situated radially outside of and being countersunk relative to the load-bearing surfaces 23, 24, and thus are unloaded. Thus, the top portion of said outer peripheral part is situated radially outside of the top portion of the upper part 22, and these portions are dimensionally so adapted relative to each other that their adjacent peripheral surfaces form a force fit when the washer parts 21 and 22 are in assembled condition. The force-fit surfaces has a sufficiently large area that the parts are kept permanently together only by means of the force fit, so that a welding of the parts in this embodiment is not necessary.

While there have been described preferred embodiments of the present invention, it will be apparent for those skilled in the art that changes and modifications can be made within the spirit and scope of the present invention as defined by the appended claims.

We claim:

1. A device for measuring compressive forces, comprising:
   an annular body having a pair of opposite, force-receiving front surfaces and a central principal axis, said front surfaces being perpendicular to said principal axis,
   said annular body further having an annular cavity essentially concentric with said principal axis and having radially inner and outer surfaces, and
   a sensor means placed in said annular cavity and adapted to deliver an electric signal representing the force influence,
   said sensor means comprising a sensor element placed on said radially inner surface of said cavity,
   said radially inner surface being situated at a distance from said principal axis essentially corresponding to the radius of moment equilibrium of the load-bearing cross-section of said annular body, said radius, $r_R$, being determined by the formula $$r_R = \frac{2}{3} \cdot \frac{r_2^3 - r_1^3}{r_2^2 - r_1^2},$$

wherein $r_1$ and $r_2$ are the inner radius and the outer radius, respectively, of said annular body.

2. The device according to claim 1 wherein the annular cavity is formed as a narrow gap with the radially inner and outer surfaces normal to the front surfaces, the cross sectional area of the annular cavity in a plane parallel with the front surfaces being much smaller than the remaining cross sectional area of the annular body in said plane.

3. The device according to claim 1 or 2 wherein the sensor means is directionally oriented, so that its most sensitive direction is substantially parallel with the central principal axis.

4. The device according to claim 1 or 2 wherein the sensor element is an amorphous, magneto-elastic ribbon which is bonded to the radially inner surface of said annular cavity, the ribbon being surrounded by an additional sensor element in the form of an excitation/pick up coil which is intended for operation at frequencies in the radio frequency range.

5. The device according to claim 1 or 2 further comprising:
   an electromagnetic transmission means for transmission of the electrical signal to an external signal receiving means without any electrical line connection.

6. The device of claim 5 wherein the electromagnetic transmission means comprises an application specific integrated circuit (ASIC) for picking up and internal processing of the sensor signals.

7. The device according to claims 1 or 2 further comprising:
   an electrical contact for transfer of the electrical signal to an external signal receiving and signal processing means.

8. The device according to claim 5 wherein the transmission means is placed in a radial bore extending from the cavity to the outer surface of the annular body.

9. The device according to claims 1 or 2 wherein the annular body is made of steel.

10. The device of claim 1 wherein the annular body is disc shaped and is made up from two washer parts defining the annular cavity in assembled condition.

11. The device according to claim 10 wherein the washer parts are joined by fusion welding at joints extending along inner and outer peripheral surfaces of the annular body.

12. A device for measuring compressive forces, comprising:

- an annular body having a pair of opposite, force receiving front surfaces and a central principal axis, said front surfaces being perpendicular to said principal axis,
- said annular body further having an annular cavity essentially concentric with said principal axis and having radially inner and outer surfaces;
- a sensor placed in said annular cavity and adapted to deliver an electric signal representing the force influence said sensor of an amorphous magneto elastic ribbon secured to the radially inner surface of said annular cavity;
- the radially inner surface being situated at a distance from said principal axis essentially corresponding to the radius of moment equilibrium of the load bearing cross section of said annular body, said radius, $r_R$, being determined by the formula $$r_R = \frac{2}{3} \cdot \frac{r_2^3 - r_1^3}{r_2^2 - r_1^2},$$

wherein $r_1$ and $r_2$ are the inner radius and the outer radius, respectively, of said annular body.

13. The device of claim 12 wherein the sensor further includes an excitation/pick up coil surrounding the ribbon, said coil intended for operation at frequencies in the radio frequency range.

* * * * *